Figure 1:
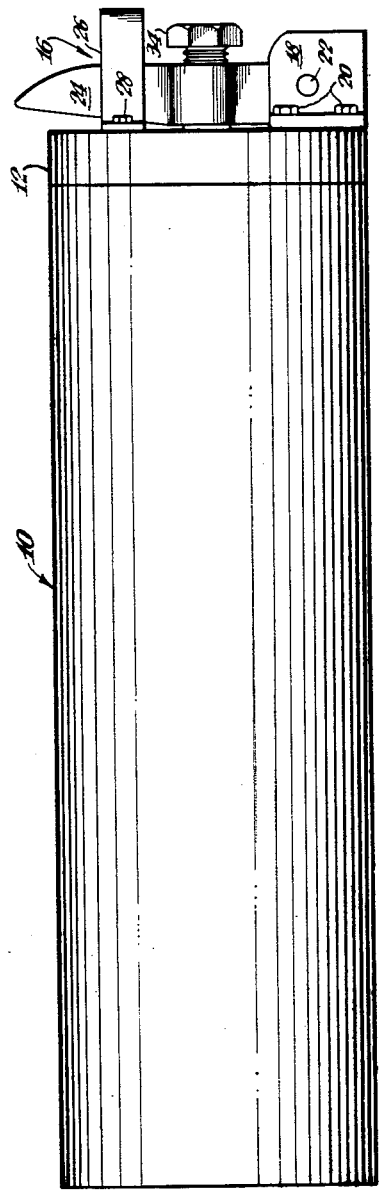

July 25, 1961

T. V. K. HILLMAN 2,993,506

PRESSURE REGULATOR

Filed May 16, 1957

INVENTOR.
Thomas V.K.Hillman.

BY Albert J. Henderson

HIS ATTORNEY.

United States Patent Office 2,993,506
Patented July 25, 1961

2,993,506
PRESSURE REGULATOR
Thomas V. K. Hillman, Corona Del Mar, Calif., assignor to Robertshaw-Fulton Controls Company, Richmond, Va., a corporation of Delaware
Filed May 16, 1957, Ser. No. 659,532
4 Claims. (Cl. 137—495)

This invention relates to flow control devices and in particular, to pressure regulators operable under conditions of high pressures and of wide variations in temperature.

It is an object of this invention to produce a high pressure regulating device which is reliable in operation over a wide range of temperature variations.

Another object of this invention is to dampen the action of a regulating control element in obtaining smooth valve movement in a pressure regulating device.

A further object of this invention is to float the valve member of a flow control device on the inlet fluid so that movement of the valve member is substantially frictionless.

This invention has another object in that the flow of inlet fluid into a flow control device acts as a scavenger to flush out foreign matter.

This invention has a further object in that the upstream pressure in a flow control device is utilized to balance a movable valve member therein.

An additional object of this invention is to combine a shutoff valve member with a regulating valve member in a flow control device in such a manner that the inlet pressure tends to maintain the regulating valve member in a closed position and is utilized to open the shutoff valve member whereby the flow is vented through the regulating valve member to equalize the pressure thereon thus facilitating actuation of the regulating valve member.

In the preferred embodiment of this invention, a floating valve member is movable to regulate a fluid flow by a regulator rod which is biased in one direction by a coil spring and in an opposite direction by a pressure sensing bellows that is responsive to outlet pressure. A fixed guide surrounds the floating valve member with a clearance therebetween and an orificed annulus integral with the exterior of the floating valve member is movable in this clearance to guide the movement of the valve member therein. This clearance between the guide and the valve member provides a communicating passage for the fluid flow from an inlet port so that the fluid flow creates a fluid bearing on which the valve member floats. The use of a floating valve member eliminates the necessity of dynamic seals, such as O-rings, which cause friction difficulties that are enhanced with variations in temperature. A shutoff valve member cooperates with a valve seat on the end of the floating valve member to cut off a fluid flow from the clearance to the central bore thereof and to close the floating valve member against the bias of the regulating spring. Upon actuation of a trigger mechanism restraining the shutoff valve member, the high pressure in the clearance moves the shutoff valve member away from its seat to permit flow through the central bore to the downstream chamber so that the regulating spring and rod can actuate the floating valve member.

Figure 2:
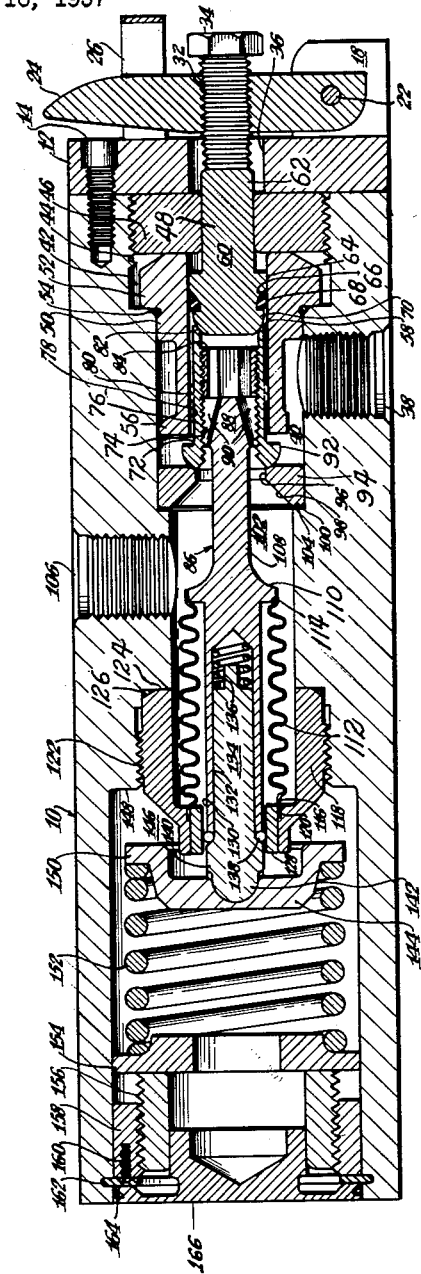

Other objects and advantages will become apparent from the following description taken in connection with the accompanying drawing wherein:

FIG. 1 is a front elevation view of a pressure regulating device embodying this invention; and FIG. 2 is a longitudinal sectional view showing the interior details of the device of FIG. 1.

Referring more particularly to the drawing, the pressure regulating device includes an elongated cylindrical housing 10 having an end cover 12 secured thereto by any suitable means such as screws 14. A trigger mechanism, indicated generally at 16, is exteriorly mounted to end cover 12 by a pair of spaced brackets 18 secured to cover 12 by any suitable means such as bolts 20. A pivot pin 22 extends between spaced brackets 18 and provides a pivotal axis for the lower ends of lever 24. The upper end of lever 24 moves in a yoke-like guide 26 having its leg flanges fixed to the end cover 12 by bolts 28. Lever 24 is retained in its operative position by any suitable latch means (not shown) and guide 26 limits the rearward movement of lever 24 to its released position. Intermediate its ends, lever 24 is expanded into a bulge with a threaded bore 32 for the reception of a screw 34. The inner end of screw 34 protrudes into an aperture 36 centrally located through cover 12.

The coaxial arrangement of the operating elements of this pressure regulating device is shown in FIG. 2 wherein an inlet port 38 communicates with an upstream chamber 40 having an enlarged cavity 42 adjacent end cover 12. The outer extremity of the enlarged cavity 42 is provided with threads 44 for the reception of a retaining plug 46 which has a centrally disposed bore 48 in alignment with but of a smaller diameter than aperture 36 for a purpose to be described hereinafter. A hollow valve guide 50 is fixedly secured within upstream chamber 40 and has an enlarged neck section 52 fitting into the inner extremity of the chambers enlarged cavity 42. Movement of guide 50 is precluded by retainer plug 46 being threaded into abutting relation therewith. An annular seal 54 compressed in chamber 40 adjacent its enlarged cavity 42 by the guide neck 52 prevents leakage of inlet fluid to the enlarged cavity 42. A plurality of spaced radially extending ribs 56 stabilize the inner end of guide 50 against the cylindrical wall defining the upstream chamber 40.

A longitudinal bore 58 extending through the center of hollow guide 50 is coaxially aligned with and of greater diameter than the central aperture 48 in retainer plug 46. A shutoff valve 60 has a valve stem 62 extending through aperture 48 and abutting the inner end of screw 34, and a valve head 64 slidably disposed in the outer section of bore 58. Intermediate its ends, the periphery of valve head 64 is notched to form a groove 66 having a cross-section that decreases in size toward the valve stem 62. An annular seal 68 having a shape substantially conforming to groove 66 is confined within the groove 66 and the adjacent cylindrical wall of bore 58. Since seal 68 moves with valve member 60, it is made of suitable material having bearing and sealing qualities, such as Teflon. Valve head 64 is provided with a truncated hemispherical end 70, the base of which has a diameter slightly less than the diameter of the main body of head 64. As is apparent in FIG. 2, the base of end 70 has an annulus which forms one of the confining walls of the groove 66.

A regulating valve member 72 having an internally threaded bore 74 is provided with a valve stem 76 which is floatingly mounted within the inner section of guide bore 58. The exterior diameter of stem 76 is slightly less than the diameter of bore 58 forming a clearance 78 therebetween. Intermediate its ends, the outer periphery of stem 76 is enlarged to form an orificed annulus 80 which is contiguous to but not in contact with the cylindrical wall of guide bore 58. One annular end of valve stem 76 is countersunk to form a shutoff valve seat 82 cooperating with the hemispherical valve head end 70 to control a fluid flow from clearance 78 to the internal bore 74 of the regulating valve member 72. A centrally hollowed set screw 84 is threaded into bore 74 and positioned adjacent one open end of valve stem 76. A control rod, indicated generally at 86, has a threaded nose section 88 which is threaded into bore 74 through the opposite open end of valve stem 76 into abutting relation with set screw 84. A plurality of longitudinal tapering bores 90 (only two being shown) in radially spaced relationship extend through nose section 88 and establish communication with the hollowed portion of set screw 84.

The floating regulating valve member 72 has an enlarged head portion 92, the extremity of which is arcuate in shape to cooperate with a corresponding arcuate recess formed on valve seat member 94. Seat member 94 may be fabricated by machining the internal walls of housing 10, however, for economy and ease of manufacture it is shown as a separate annular unit having an outer diameter minutely larger than the diameter of bore 40 so that it may be rigidly mounted therein with an interference fit. Seat member 94 has an internal fluid passage consisting of a cylindrical bore 96 uniting with a conical bore 98. An annular shoulder 100 separates upstream chamber 40 and downstream chamber 102 and a ring gasket 104, of any suitable material, is positioned between shoulder 100 and the base of valve seat member 94 to prevent leakage therebetween.

An outlet port 106 communicates with downstream chamber 102 for delivering a fluid flow therefrom. The regulating control rod 86 comprises a reduced section 108 having a portion extending through seat bores 96 and 98 for uniting with its nose section 88 and having a portion disposed in the downstream chamber 102 for uniting with a centrally disposed annular flange 110. A bellows 112 has one end 114 attached to flange 110 and an opposite end 116 attached to a bellows retainer 118 by means of an annular recess 120 therein. Bellows retainer 118 is in the form of a hollow nut which is threaded into an enlarged bore 122 separated from the cylindrical wall of downstream chamber 102 by an annular shoulder 124. An annular seal 126 is compressed between adjacent surfaces of bellows retainer 118 and shoulder 124. The internal bore of hollow retainer 118 has a large diameter section of similar size as and forming an extension of downstream chamber 102, and a small diameter section which includes the bellows attaching recess 120. A cylindrical bearing 128 fits within the small diameter bore of retainer 118 and covers the recess 120.

Bearing 128 provides a slidable mounting for the end 130 of control rod 86 opposite the rod nose section 88 for a purpose to be described hereinafter. End 130 of rod 86 has a cylindrical cavity 132 for telescopically receiving a damper rod 134. A coil spring 136 is biased between the bottom of cavity 132 and the telescoping end of damper rod 134. A damping ring 138 slidably engages bearing 128 and is positioned between the ring outer end 134 of control rod 86 and enlarged neck 140 on the outer portion of damper rod 134. A hemispherical end 142 on damper rod 134 engages a correspondingly shaped recess in the base of a cup-shaped spring plate 144 which has an internal diameter sufficiently large that the cup plate 144 overrides the free end of bellows retainer 118, which free end protrudes into a spring chamber 146. Spring chamber 146 having a larger diameter than the enlarged bore 122, is separated therefrom by an annular shoulder 148 and extends longitudinally to form an opening in the rear end of housing 10.

An annular flange 150 on the periphery of cup plate 144 engages one end of a coil spring 152 whose opposite end engages an adjustable spring plate 154. An adjusting screw 156 threadedly engages an adjustment nut 158 and abuts spring plate 154 to vary the tension on coil spring 152. Adjustment nut 158 is held in position by a drive screw 160 threaded through a lock ring 162 fixedly mounted in an annular recess in the cylindrical wall of bore 146. An annular seal 164 and a cover 166 close the open end of bore 146.

Operation

With the flow control device in its inoperative position as illustrated in FIG. 2, the regulating valve head 92 is held in contact with valve seat 94 by the action of screw 34 maintaining shutoff valve member 60 in contact with the valve seat 82 on the open end of hollow valve member 72. The mechanical force exerted by trigger mechanism 16 also causes compression of regulating coil spring 152 which may be adjusted by screw 156 to correspond to a desired outlet pressure. The high pressure fluid from inlet port 38 fills the upstream chamber 40 and the clearance 78 whereby the inlet pressure compresses seal 68 between the confines of groove 66 and the wall of base 58 to prevent any leakage.

To place the device in operation, the trigger mechanism 16 is actuated by any suitable means which in this case comprises manual actuation, to a released position whereby the screw 34 is moved out of abutting engagement with the shutoff valve stem 62. Under the force of the high pressure fluid in clearance 78, acting on shutoff valve head 64, shutoff valve member 60 moves away from its valve seat 82 to a position where the rear face of shutoff valve head 64 engages stop plug 46. The inlet pressure of the fluid causes the shutoff valve member 60 to remain in this position until the trigger mechanism 16 is manually actuated to its operative position to restore its restraining force on the shutoff valve stem 62.

As the shutoff valve member commences moving toward its open position, the inlet fluid flows from the clearance 78 past the shutoff valve seat 82, into the bore 74 of regulating valve member 72, through the hollow set screw 84, the tapering ports 90, the valve head 92, and the valve seat 94 into the downstream chamber 102. With the fluid pressure equalized internally and externally of hollow regulating valve stem 76 and on both sides of regulating valve head 92 the stability of regulating valve member 72 is assured and its movement facilitated. Thus, the inlet pressure, acting on the rear face of regulating valve head 92 and tending to maintain regulating valve member 72 in a closed position, is vented to downstream chamber 102 via the internal bore 74.

The release of shutoff valve member 60 permits the regulating spring 152 to move control rod 86 and thus unseat the regulating valve member 72. As is illustrated in FIG. 2, the distance traversed by shutoff valve member 60 is greater than the distance traversed by regulating valve member 72 so that the shutoff valve seat 82 thereon cannot engage shutoff valve head 64 of cut-off flow therethrough during operation. Accordingly, the fluid flow from upstream chamber 40 through the clearance 78 and orificed annulus 80 continues during the regulating operation and provides a fluid bearing for the regulating valve member 72 as well as acting as an scavenger to flush out any foreign matter. Regulating valve member 72 is floatingly supported on this fluid cushion and its movement is guided by the orificed annulus 80 which also acts as a scraper to remove any foreign substance that could cause seizing of valve member 72 in the guide bore 58.

When the regulating valve member 72 is unseated, the major portion of the inlet fluid flows directly through the bore of valve seat 94 into the downstream chamber 102 and thence to outlet port 106. The presence of fluid in downstream chamber 102 pressurizes the exterior of bellows 112 causing the contraction thereof. The contraction of bellows 112 tends to move the control rod 86 in a direction opposite to the direction in which it is moved by the regulating spring 152. Consequently, when the product of the effective bellows area multipled by the outlet pressure acting on it equals the force exerted by the regulating spring 152, the floating valve member 72 will be positioned to automatically deliver the fluid at the desired outlet pressure, regardless of surges or variations in the inlet pressure.

Variations in the inlet pressure cause regulating valve member 72 to move to a different balanced condition wherein the pressure drop across regulating valve member 72 offsets the pressure variation to maintain the outlet pressure relatively constant. If the inlet pressure should increase, the outlet pressure initially increases causing bellows 112 to collapse slightly and move valve member 92 toward the valve seat 94. This movement restricts the flow causing an increase in the pressure drop across the regulating valve and a resultant decrease in the outlet pressure to offset the initial increase. If the inlet pressure increases sufficiently to cause bellows 112 to collapse until valve member 92 is seated, fluid continues to flow from inlet 38 to outlet 106 through clearance 78 and regulating valve member 72.

If the inlet pressure should decrease, the outlet pressure initially decreases causing bellows 112 to extend slightly and move valve member 92 away from valve seat 94 to increase the flow rate, decrease the pressure drop across the regulating valve, and increase the outlet pressure to offset the initial decrease.

The lack of friction between the guide bore 58 and floating valve member 72 eliminates temperature operating limits and permits immediate reverse movement thereof so that the automatic positioning of valve head 92 relative to valve seat 94 in upstream chamber 40 is instantaneous in response to the movement of the pressure sensing bellows 112 in downstream chamber 102. Furthermore, smooth valve movement is assured because damping rod 134, damping ring 138 and damping spring 136 compensate for sudden forces exerted by regulating spring 152 due to pressure surges or drops sensed by bellows 112. When such a pressure surge or drop does occur, there is relative movement between the damping rod 134 and the control rod 86 so that the damping ring 138 is squeezed between the control rod end 130 and the damping rod neck 140. In its squeezed condition the damping ring 138 acts as a friction brake and exerts a friction braking force against the internal wall of cylindrical bearing 128. As soon as the acting force, i.e., the resultant force between the regulating spring force and the bellows force, exceeds the friction braking force, the damping rod 134, damping ring 138 and control rod 86 move as a unit. By damping the movement of control rod 86, there is no tendency of the floating valve member 72 to overshoot or hunt, but rather it will directly seek its regulating position with a balanced movement.

Only one embodiment of the invention has been shown and described herein and inasmuch as this invention is subject to many variations, modifications and reversal of parts, it is intended that all matter contained in the above description of this embodiment shall be interpreted as illustrative and not in a limiting sense.

What is claimed is:

1. In a flow control device, the combination comprising a housing having an inlet port communicating with an upstream chamber and an outlet port communicating with a downstream chamber, valve means operable to regulate a flow between the chambers, a control element having a longitudinal bore in one end in the downstream chamber and having an opposite end extending into the upstream chamber for connection with said valve means, pressure sensing means having a fixed end and a movable end operatively connected to said control element for actuating the same to operate said valve means in one direction and being responsive to a pressure of the flow in the downstream chamber, retainer means secured in said downstream chamber for retaining the fixed end of said pressure sensing means, yieldable means positioned in the bore of said control element, a damping rod having an inner end extending into the bore into biased engagement with said yieldable means, a damping ring mounted on said damping rod adjacent its outer end and engaging said retainer means to balance the actuation of said control element, and resilient means operatively connected to said damping rod for actuating said control element in opposition to said pressure sensing means to operate said valve means in an opposite direction.

2. A pressure regulating device comprising a housing having a plurality of ports, a chamber establishing communication between said ports, a valve seat in said chamber, a regulating valve cooperating with said valve seat to regulate a flow of fluid therebetween, actuating means to move said valve to a regulating position relative to said valve seat, shutoff valve means having a valve head cooperating with said regulating valve and a valve stem protruding through said housing, said shutoff valve means being movable from an operating position and retained in a released position by pressure of the flow of fluid in said chamber, and a trigger mechanism for said shutoff valve means being movable from a first position where it retains said shutoff valve means in its operating position to a second position where it permits said shutoff valve means to be moved to its released position.

3. In a pressure regulating device, the combination comprising an upstream chamber having an inlet port, a downstream chamber having an outlet port, a valve seat separating said chambers, a valve member cooperating with said valve seat and being movable to regulate a fluid flow between said chambers, means on said valve member defining a communicating passage between said chambers, shutoff valve means disposed in said upstream chamber adjacent said valve member for cooperation therewith, said shutoff valve means being movable in response to fluid pressure in said upstream chamber from an operating position in which movement of said valve member is obstructed and a fluid flow through said communicating passage means is prevented to a released position in which movement of said valve member is permitted and a fluid flow through said communicating passage means is permitted, a control member positioned in said downstream chamber and extending into said upstream chamber to actuate said valve member, a regulating spring biasing said control member to move said valve member, and sensing means connected to said control member and being responsive to the fluid pressure in said downstream chamber so that the regulating position of said valve member is dependent thereon.

4. A flow control device comprising a casing formed with an inlet, an outlet, and a flow passage extending between said inlet and said outlet, a first valve seat disposed in said passage, a generally tubular movable valve element formed with a second valve seat at one end and a first valve member at the other end cooperable with said first valve seat for regulating a flow through said casing, said valve element being cooperable with said casing to form a fluid bearing when said valve element is in a regulating position, a shutoff valve means comprising a second valve member disposed within said casing and being cooperable with said second valve seat to control the movement of said valve element between on and off positions, pressure sensing means disposed in said flow passage downstream from said first valve seat and being movable in response to variations in the outlet pressure, a control rod extending between said pressure sensing means and said valve element for moving said valve element when said second valve member is in an on position to regulate the flow between said first valve member and said first valve seat, and resilient means operatively connected to said control rod to oppose movement caused by said pressure sensing means, the operative connection including damping means connected to said control rod for balancing the actuation thereof.

References Cited in the file of this patent

UNITED STATES PATENTS

| 48,166 | Fox | June 13, 1865 |
| 409,626 | Bell | Aug. 20, 1889 |
| 552,202 | Scott | Dec. 31, 1895 |

(Other references on following page)

UNITED STATES PATENTS

| | | |
|---|---|---|
| 792,757 | Cloos | June 20, 1905 |
| 852,425 | Ellis | May 7, 1907 |
| 1,238,051 | Peterson | Aug. 21, 1917 |
| 1,739,926 | Steltner | Dec. 17, 1929 |
| 1,897,517 | Hughes | Feb. 14, 1933 |
| 2,338,760 | Deming | Jan. 11, 1944 |
| 2,674,829 | St. Clair | Apr. 13, 1954 |
| 2,690,761 | Gray | Oct. 5, 1954 |
| 2,731,034 | Dinkelkamp | Jan. 17, 1956 |